(No Model.)

R. R. RICHMOND.
AUTOMATIC MACHINE GUN.

No. 572,771.

Patented Dec. 8, 1896.

Witnesses.
H. B. Hallock.
S. J. Williamson

Inventor
Romulus R. Richmond
by Geo. H. Holgate
By his Attorney

5 Sheets—Sheet 1.

(No Model.)

R. R. RICHMOND.
AUTOMATIC MACHINE GUN.

No. 572,771.

5 Sheets—Sheet 2.

Patented Dec. 8, 1896.

Witnesses:
H. W. Hallock
S. S. Williamson

Inventor
Romulus R. Richmond
by G. E. H. Hodges
By his Attorney.

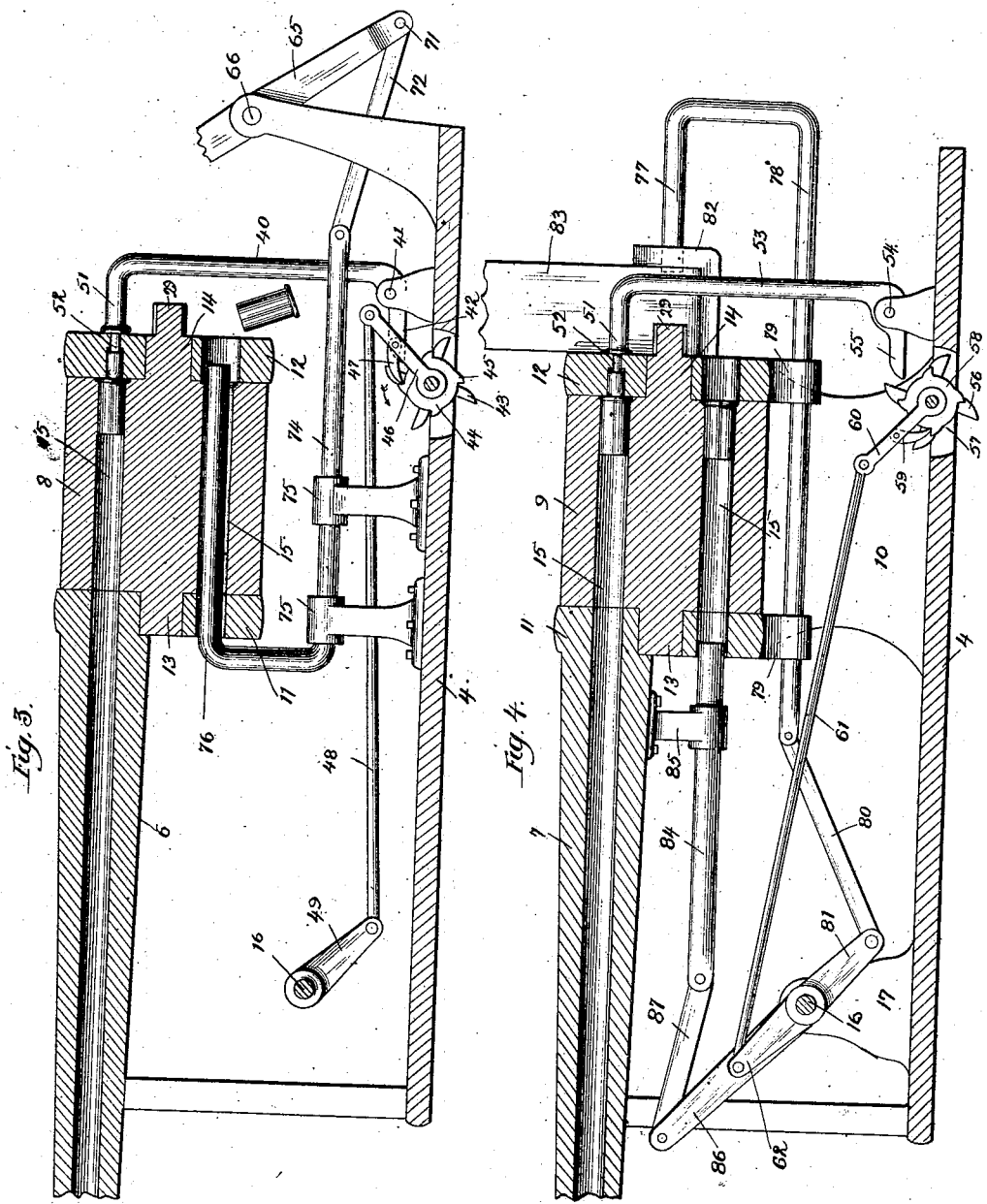

(No Model.)

R. R. RICHMOND.
AUTOMATIC MACHINE GUN.

No. 572,771.

5 Sheets—Sheet 4.

Patented Dec. 8, 1896.

Witnesses:
H. B. Hallock
S. J. Williamson

Inventor:
Romulus R. Richmond
by Geo. H. Holgate
By his Attorney (No Model.) 5 Sheets—Sheet 5.
R. R. RICHMOND.
AUTOMATIC MACHINE GUN.
No. 572,771. Patented Dec. 8, 1896.
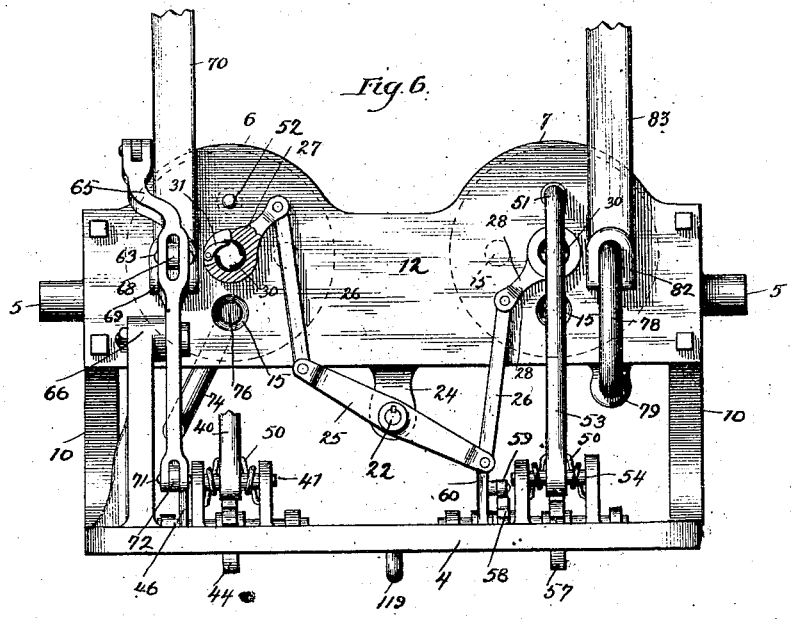
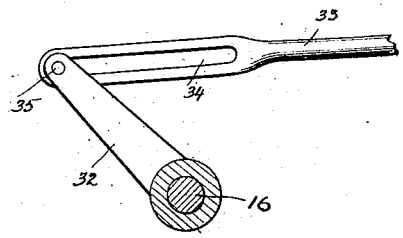
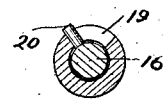
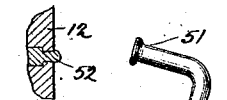
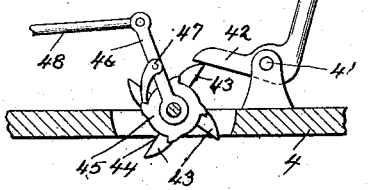
Witnesses:
H. B. Hallock.
J. T. Williamson.
Inventor
Romulus R. Richmond
by Geo. H. Holgate
his Attorney

UNITED STATES PATENT OFFICE.

ROMULUS R. RICHMOND, OF CHARITON, IOWA.

AUTOMATIC MACHINE-GUN.

SPECIFICATION forming part of Letters Patent No. 572,771, dated December 8, 1896.

Application filed June 19, 1896. Serial No. 596,197. (No model.)

*To all whom it may concern:*

Be it known that I, ROMULUS R. RICHMOND, a citizen of the United States, residing at Chariton, in the county of Lucas and State of Iowa, have invented certain new and useful Improvements in Automatic Machine-Guns, of which the following is a specification.

My invention relates to a new and useful improvement in automatic rapid-firing machine-guns, and has for its object to so construct and organize such a gun as to bring about the several operations necessary to loading and discharging a gun automatically, and upon the firing of the first discharge to store a sufficient amount of energy from the gases generated by the exploding material to bring about a continuous operation of the several mechanisms thereof without attention upon the part of the operator.

Another object of my invention is to provide means whereby the continuous discharging of the gun may be arrested at any time by simply cutting off communication between the storage-tank and the power-cylinder.

With these ends in view my invention consists in the details of construction and combination of elements hereinafter set forth and then specifically designated by the claims.

In order that those skilled in the art to which this invention appertains may understand how to make and use the same, I will describe its construction and operation in detail, referring to the accompanying drawings, forming a part of this specification, in which—

Figure 1:
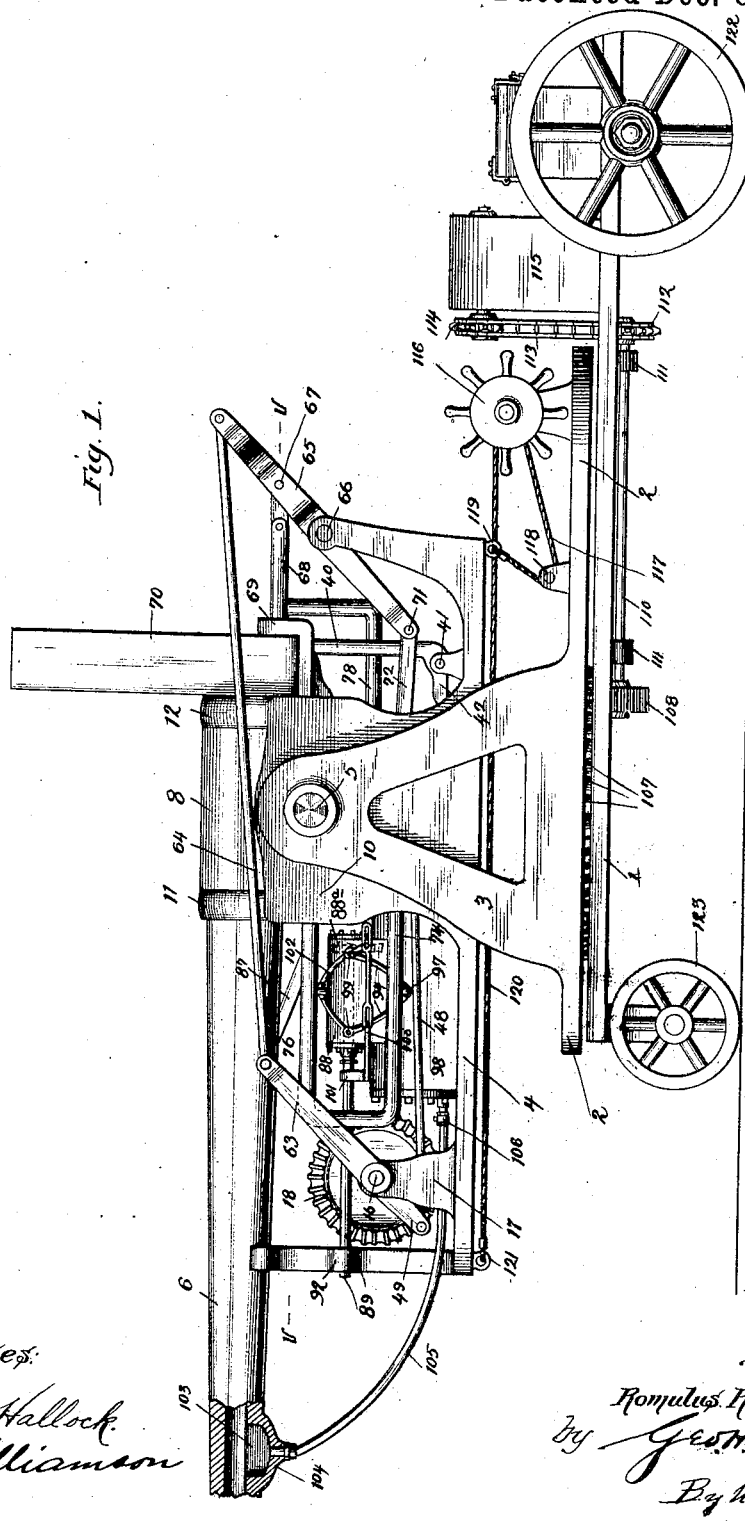
Figure 2:
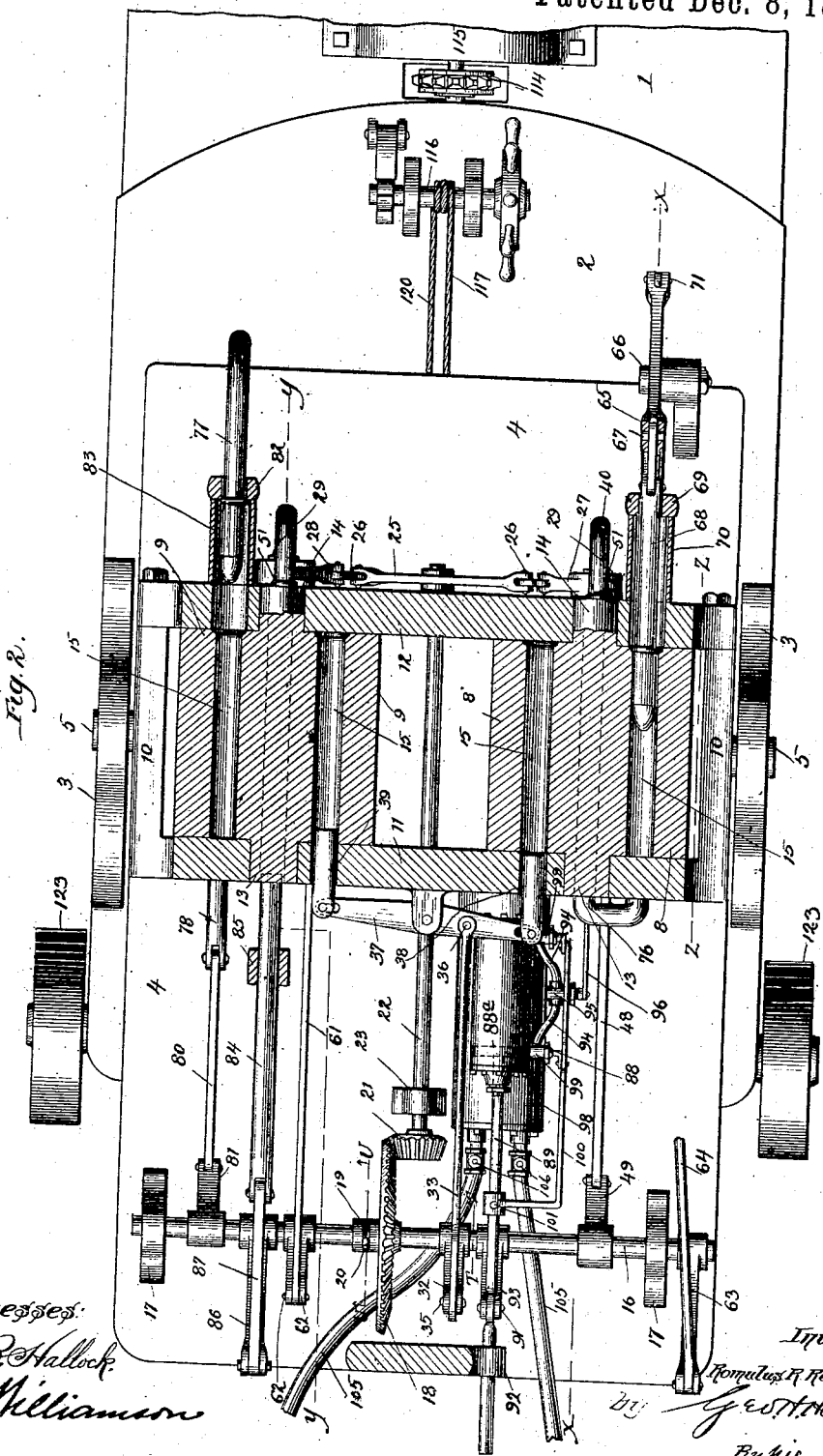
Figure 5:
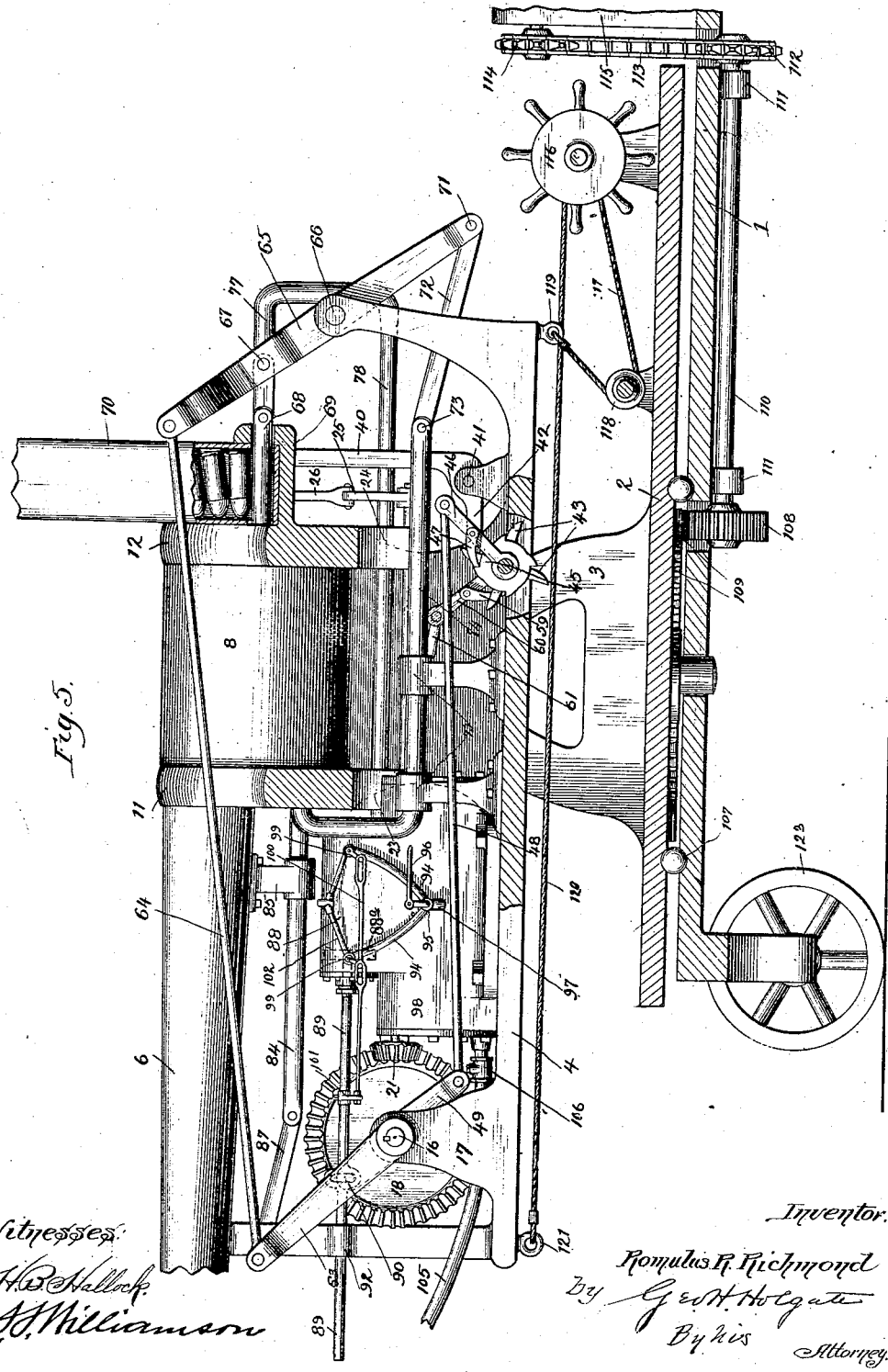

Figure 1 is a side elevation of a gun built in accordance with my improvement; Fig. 2, a section at the line *v v* of Fig. 1; Fig. 3, a section at the line *x x* of Fig. 2; Fig. 4, a section at the line *y y* of Fig. 2; Fig. 5, a section at the line *z z* of Fig. 2; Fig. 6, a rear view of the gun; Fig. 7, a section at the line T T of Fig. 2; Fig. 8, a detail view of the hammer and mechanism for actuating the same, and Fig. 9 a section at the line U U of Fig. 2.

Referring to the drawings in detail, 1 represents the carriage, which may be of any desired construction or design, having mounted thereon the swiveled platform 2, which latter is provided with the uprights 3, in which is trunnioned at 5 the gun-bed 4, and this bed consists of a platform adapted to carry the various mechanisms necessary to load and fire the barrels of the gun, and has mounted thereon the two barrels 6 and 7, as also the two firing-cylinders 8 and 9, which work in conjunction with the barrels 6 and 7, respectively.

Formed with or bolted to the trunnion-blocks 10 are the cylinder-plates 11 and 12, the latter forming the breech-block and the former acting as the rear support for the barrels and as a recoil-stay. Between these cylinder-plates are pivoted the cylinders 8 and 9 upon the trunnions 13 and 14, as clearly shown in Fig. 2. Each of the cylinders is provided with four firing-chambers 15, each of which latter is adapted to be brought into conjunction with the bore of the barrel corresponding to the cylinder in which said chambers are formed, so that balls discharged from the chambers of the cylinders will be projected through the barrels for the purposes of increased velocity and accuracy of aim, as is well understood in ordnance, and the revolving of these cylinders is brought about in the manner hereinafter set forth.

To effect the several movements of the various mechanisms of the gun in time, a main shaft 16 is journaled within the bearings 17 upon the front end of the gun-bed, and loosely mounted upon this shaft is a beveled wheel 18, having a slot 19 formed in the hub thereof, into which projects a pin 20, the latter being secured to the shaft so that when said shaft is turned a certain amount of lost motion is permitted before the gear-wheel is caused to move with the shaft for the purpose hereinafter set forth. Meshing with the gear 18 is a beveled pinion 21, carried upon the outer end of the shaft 22, which latter is journaled in the bearings 23 and 24. Upon the inner end of this longitudinal shaft is secured a double lever 25, the ends of which are connected by the links 26 to the ratchet-arms 27 and 28. These arms are journaled upon the extensions 29 of the trunnions 14 of the cylinders 8 and 9, said extensions having ratchet-teeth 30 cut thereon, and each of the arms is provided with a pawl 31, by means of which the oscillatory motion which is imparted to the arms 27 and 28 will cause the cylinders 8 and 9 to revolve intermittently step by step, and the mechanism which brings about these movements is so arranged and timed as to cause one cylinder to dwell while the other is being rotated, the reason for which will presently appear.

Rigidly secured upon the main shaft 16 is an arm 32, the outer end of which is bifurcated for the reception and guidance of the outer end of the rod 33, which latter is provided with a slot 34, engaged by a pin 35, set in the end of the arm 32, so that when the shaft 16 is oscillated but a part of the movement of the outer end of the arm will be imparted to the rod 33, and this near each end of the movements of said arm. The rod 33 is pivoted at 36 to a rock-lever 37, the latter having pivoted at one of its ends a locking-bolt 38 and at its opposite end a locking-bolt 39. These bolts are fitted to slide snugly within the cylinder-plate 11, and are adapted to pass into engagement with one of the chambers 15 of the cylinders, so as to lock said cylinders against the slightest movement when the chamber to be fired is brought into proper alinement with the bore of the barrel corresponding thereto, and in the organism of my present improvement the locking of the cylinder takes places immediately after the latter has been turned and just prior to the firing of the charge contained within the chamber in alinement with the barrel.

The firing of the cartridge or shell, which has previously been inserted within the firing-chamber, is effected in the cylinder 8 by the hammer 40, which is pivoted at 41, the heel end 42 thereof projecting within the field of a series of wiper-cams 43, carried by the cam-wheel 44, which latter has journaled upon the same shaft therewith a ratchet-wheel 45, having teeth corresponding in number to said wipers. A lever 46 is pivoted concentric with the ratchet-wheel and carries a pawl 47, adapted to engage with the teeth of said ratchet, so as to impart an intermittent step-by-step rotary motion to said ratchet in the direction of the arrow next adjacent thereto, and this lever in turn receives its motion, through the rod 48, from the arm 49, which is rigidly secured to the main shaft 16, as clearly shown in Fig. 3. Thus when said shaft is oscillated, as hereinafter set forth, one of the wiper-cams will be caused to operate upon the heel of the hammer for every complete oscillation of said shaft, whereby said hammer will be swung backward against the action of the spring 50, and when this wiper passes beyond the heel of the hammer the latter will be forced inward by said spring, its nose 51 striking the firing-pin 52 in such manner as to discharge the cartridge or shell within the firing-chamber in the well-known manner. This same result is accomplished in connection with the cylinder 9 by the hammer 53, which is pivoted at 54 and has its heel 55 within the field of action of the wiper-cams 56, carried by the cam-wheel 57, to which is secured the ratchet-wheel 58, adapted to be actuated by the pawl 59, carried by the lever 60, in the same manner as that described in connection with the firing mechanism of the cylinder 8. The lever 60 is connected by the rod 61 to the arm 62, which latter is secured rigidly upon the main shaft 16, and extends in a direction diametrically opposite to that in which the arm 49 extends, the object of which is to cause the hammer-actuating mechanisms of the two barrels to operate alternately.

An arm 63 is secured to the main shaft, and by means of the rod 64 is connected to the double lever 65, which is pivoted at 66, and in turn has pivoted thereto at 67 the loading-plunger 68, the latter being guided within the bracket 69, so as to insert a cartridge or shell within one of the firing-chambers of the cylinder 8, the cartridges being fed into line with the proper firing-chamber of said cylinder by a chute or magazine-belt 70, as clearly shown in Fig. 5, where a portion of said chute is broken away, illustrating the relative position of the cartridges to the loading-plunger.

To the lower end of the lever 65 at 71 is pivoted a link 72, the opposite end of which is pivoted at 73 to the ejector-bar 74, which latter is guided in suitable bearings 75 and carries the ejector 76, and this ejector is adapted to pass through a suitable hole in the cylinder-plate 11, arranged in line with the lower chamber of the cylinder 8 when the upper chamber thereof is in line with the barrel. From this it will be seen that when proper oscillation is imparted to the main shaft the lever 65 will be caused to rock upon its pivot-point to such a degree as to cause the loading-plunger to force the bottom shell from the magazine into the outer firing-chamber of the cylinder 8 at the same time the ejector will be forced into the lower chamber of said cylinder, thereby ejecting the shell of a cartridge previously fired, and the distance of the loading-plunger and ejector from each other is such relative to the length of the cylinder as to permit both the plunger and extractor to be out of the cylinder during the lapse of a sufficient length of time to permit the turning of said cylinder by the mechanism before described. This same result is brought about in connection with the cylinder 9 by the loading-plunger 77, carried by the plunger-bar 78, guided in suitable bearings 79, and connected by the link 80 to the arm 81, which is rigidly secured upon the main shaft 16. This plunger is guided in the bracket 82, so as to operate upon the bottom cartridge in the magazine 83 to force said cartridge within the proper chamber of the cylinder 9. The ejector 84 is guided by the bearing 85 and a suitable hole in the cylinder-plate 11, so as to come in line with the lower chamber of its cylinder, and motion is imparted to said ejector from the arm 86 through the link 87, said arm being rigidly secured upon the main shaft 16.

From the foregoing description it is obvious that should the several mechanisms be properly timed and an oscillatory movement given to the main shaft 16, as hereinafter described, each of the firing-cylinders will be alternately operated and one of the chambers therein will be loaded, unlocked, the ejector withdrawn, after which the cylinder will be turned through a distance equal to one of the chambers therein, the barrel again locked, immediately after which the cartridge will be fired, the ejector run through the proper chamber to extract the shell previously fired, and a new cartridge inserted during the time that the ejector is being withdrawn from its chamber, which completes the several steps taken in the operation of each of the cylinders and brings the mechanisms to a point where the cylinder is again ready to be turned another step.

It is to be noted that one round of discharges must take place before the several mechanisms will be useful in their operations, as, for instance, when the first cartridge is loaded and fired the operations of the ejector while proceeding will have no shell to eject.

Since the operations of loading and turning one of the cylinders, in order that the loaded chamber may be brought to the proper position to be fired, takes place during the time that one of the chambers of the opposite cylinder is being fired, it will be seen that the discharges of the gun from its two barrels will be almost continuous.

In order that the main shaft 16 may be given its proper oscillations, I provide a power-cylinder 88, in which is placed a piston 88ᵃ of any ordinary construction, and to this piston is connected the piston-rod 89, having a cross-slot 90 formed therein with which the pin 91 engages. The piston-rod is provided with an extension running in a bearing 92 for the purpose of guiding said rod against lateral movements.

The pin 91, which engages the slot 90, is secured within the outer end of the crank-arm 93, and the latter is secured to the main shaft 16, so that when the piston-rod is moved to and fro, as hereinafter described, said shaft is given an oscillatory movement.

Leading to each end of the power-cylinder 88 is an induction-pipe 94, and these two pipes converge and meet at 95, where a throttle-valve is placed for the control of the flow of gas through said pipes, and for convenience of operation a hand-rod 96 is pivoted to a lever carried by said valve, and this rod extends backward into easy reach of the manipulator of the gun.

A pipe 97 leads from the reservoir-tank 98 to the induction-pipes 94 and connects with the latter at the point where the valve 95 is placed, the valve being of such construction as to permit the flow of gas from the pipe 97 through both of the pipes 94 or cut off said flow. At the upper ends of the pipes 94, where they enter the power-cylinder, are located the valves 99, which are connected by a valve-rod 100 to the piston-rod at 101, and this valve-rod is slotted at the points where it is connected to the levers of the valves 99, in order that considerable lost motion may be had between the movements of the piston-rod and the operations of the valves, with the obvious result of holding the valves open or closed, as the case may be, through a considerable portion of the movement of the piston, thus permitting the inflowing of gas from the reservoir-tank to first one end of the cylinder and then the other, and while the gas is being admitted to one end of the cylinder it is being exhausted at the other end through one of the exhaust-pipes 102. By this arrangement so long as the reservoir is supplied with gas or other fluid under sufficient pressure and the passage therebetween and the power-cylinder remains open the oscillations of the shaft 16 will continue, from which oscillations the several mechanisms which bring about the loading and discharging of the two barrels of the gun will continue their operations automatically without attention upon the part of the manipulator, the only requirement being that the magazines shall be kept supplied with cartridges, and as this may be done by feeding said magazines from their upper ends the gun may be caused to continue its discharges indefinitely without interruption.

The storing of gas under pressure in the reservoir 98 is accomplished in the following manner: Near the outer end of each of the barrels is formed a slot 103, under which is placed a cap 104, and from this cap leads a tube 105, which is connected at its opposite end to the reservoir at 106, it being noted that there are two of these tubes entering the reservoir. Now when a discharge takes place in either of the cylinders and the ball is projected through the barrel after passing the slot 103 the gases of explosion will have access to the reservoir through the slot and tube 105, and by means of a check-valve located within the tube at 106 said gas is permitted to enter the reservoir, after which the check-valve will close and prevent the egress of said gas. As this takes place at every discharge through either of the barrels, it is obvious that the reservoir will be kept supplied with gas under considerable pressure so long as the firing of the gun continues. Thus it will be seen that after the first cartridge has been discharged, thereby creating a pressure within the reservoir, further operations of the mechanisms to continue the loading and firing of the cylinders of the gun may be had by simply establishing communication between the reservoir and the power-cylinder 88 by the proper manipulation of the valve 95 through the main rod 96, as before described.

The aiming of the gun in horizontal planes is accomplished by the movements of the swiveled platform upon the carriage, as is well understood in ordnance, and to facilitate the movements of this platform upon the carriage I provide a series of balls 107, which are arranged within suitable annular grooves formed in the upper surface of the carriage and the lower surface of the platform, and the swinging of this platform is controlled by the meshing of the pinion 108 with the gear-teeth 109, formed upon said platform. The pinion 108 is secured upon the inner end of the shaft 110, which latter is journaled within the bearings 111 and has upon its outer end a sprocket-wheel 112, geared by the chain 113 to the sprocket-wheel 114, the latter being carried by a shaft which is connected with a suitable motor run from a storage battery 115 or other suitable source of power. By the provision of a suitable switchboard it will be seen that the gun may be quickly swung upon its pivot through a large sweep in either direction. To aim the barrels of the gun at different angles, I provide a windlass 116, upon the drum of which is coiled a cable 117, the latter passing around the pulley 118 and having its free end attached to the eye 119, carried by the gun-bed. Also carried by the same windlass is a cable 120, which is attached to the eye 121, secured to the forward end of the gun-bed, so that when the windlass is operated the gun-bed will be swung upon the trunnions 5, thereby bringing the barrels of the gun at any desired angle within its range.

The carriage may be mounted upon suitable truck-wheels 122 and 123, so that it may be conveyed from one place to another, or when the gun is intended for fortification or marine use the wheels may be dispensed with and the carriage either made stationary or adapted to slide upon a truck, so as to be brought out of and into operative position, as occasion may require.

One of the advantages of my improved gun is that a single person may operate such a gun, as it is only necessary to bring about the initial discharge and keep the magazines loaded, and as this requires but little attention the remainder of the time may be given to the proper sighting of the barrels.

I am aware that many slight modifications might be made in the mechanisms here shown and described, as, for instance, the windlass and cables may be dispensed with, and in their stead a worm and segmental worm-gear might be used to bring about the same results, or a jack-screw be so arranged as to raise and lower the gun-bed for changing the angles of the barrels.

The initial pressure within the reservoir-cylinder may be established in any well-known manner, such as by air-pump or the discharge of a blank cartridge therein; but in practice I prefer to give this initial pressure by discharging a cartridge through one of the barrels, which may be brought about by providing a suitable handhold upon one of the hammers, so that said hammer may be turned backward against the action of its spring, and after the insertion of a cartridge be released, thus firing said cartridge, from which explosion a sufficient amount of the gas will pass through one of the tubes 105 to the reservoir, after which it is only necessary to establish communication between said reservoir and the power-cylinder by the operation of the throttle-valve 95, as before described.

I have shown and described two guns mounted upon a single bed, having connected therewith the various mechanisms for operating the same; but it is obvious that any number of guns within certain limits may be thus mounted so as to work in conjunction with each other, and the greater the number of guns the more nearly continuous will be the firing when the mechanisms are properly timed.

Having thus fully described my invention, what I claim as new and useful is—

1. In a rapid-firing machine-gun, the combination of a trunnioned gun-bed, a series of barrels mounted thereon, a series of cylinders corresponding in number to said barrels adapted to work in conjunction therewith, mechanisms for bringing about the several operations of the cylinders, a main shaft from which said mechanisms receive their actuations, a reservoir, means for connecting said reservoir with the barrels of the gun whereby a portion of the gases of explosion pass from said barrels to the reservoir, a power-cylinder communicating with said reservoir, and means—such as a piston and rod—for bringing about the movements of the main shaft, substantially as shown and described.

2. In a rapid-firing gun, a swiveled platform, a gun-bed trunnioned to said platform, a series of gun-barrels mounted upon said bed, a series of cylinders adapted to work in conjunction with said barrels, means for aiming the barrels, mechanisms for loading, firing, turning the cylinders and ejecting the used shells, a main shaft for operating the several mechanisms, a power-cylinder having a piston adapted to slide therein, said piston being connected to the main shaft by a suitable rod, valve mechanism for controlling the induction of compressed gas to the power-cylinder, a reservoir-tank for retaining the compressed gas, and means for admitting gas to said reservoir under pressure from the gun-barrels, substantially as shown and described.

3. In a rapid-firing machine-gun, the combination of a carriage, a swiveled platform mounted thereon, mechanism for turning said platform, a gun-bed trunnioned upon the platform, mechanism for swinging said bed, a series of gun-barrels mounted upon the bed, a series of cylinders corresponding with the number of barrels, each cylinder having four firing-chambers therein which are adapted to be successively brought into alinement with the bores of the barrels, magazine-chutes so arranged that the bottom cartridges therein will lie in alinement with certain of the chambers, hammers for firing the cartridges when brought into alinement with the gun-barrels, ejectors adapted to force the used shells out of the chambers, means for revolving the cylinders intermittently step by step, means for locking said cylinders after being revolved, mechanisms for bringing about these several movements, a main shaft carrying a series of arms for imparting motion to said mechanisms, a power-cylinder having a piston therein, said piston being connected by a rod to a suitable arm carried by the main shaft, a reservoir for containing gas under pressure, valve mechanism for controlling the induction of said gas from the reservoir to the power-cylinder, tubes leading from the barrels to the reservoir, and check-valves arranged within the passages of said tubes, substantially as and for the purposes set forth.

4. In a rapid-firing machine-gun, the combination of a carriage, a swiveled platform mounted thereon, mechanism for turning said platform, a gun-bed trunnioned upon the platform, mechanism for swinging said bed, a series of gun-barrels mounted upon the bed, a series of cylinders corresponding with the number of barrels, each cylinder having four firing-chambers therein which are adapted to be successively brought into alinement with the bores of the barrels, magazine-chutes so arranged that the bottom cartridges therein will lie in alinement with certain of the chambers, loading-plungers for forcing the bottom cartridges of the magazines within the proper chambers of the cylinders, hammers for firing the cartridges when brought into alinement with the barrels, ejectors for forcing the used shells from out the cylinders, locking-bolts adapted to hold the cylinders against movement when the firing takes place, mechanisms for bringing about the movements of said parts, a main shaft journaled upon the gun-bed, a series of arms carried by said shaft for effecting the movements of the mechanisms, a beveled gear loosely mounted upon said shaft, a pin projecting from said shaft into engagement with a slot formed in the hub of said gear whereby the latter is caused to revolve in two directions and dwell, a pinion meshing with said gear, a shaft upon which said pinion is secured, a double lever carried upon the opposite end of said shaft, ratchet-arms pivoted to the cylinder, links for connecting the ends of the double lever to the ratchet-arms, pawls carried by said arms, ratchets with which said pawls are adapted to engage, and means for effecting the movements of the main shaft, substantially as shown and described.

5. In a rapid-firing machine-gun, the combination of a carriage, a swiveled platform mounted thereon, mechanism for turning said platform, a gun-bed trunnioned upon the platform, mechanism for swinging said bed, a series of gun-barrels mounted upon the bed, a series of cylinders corresponding with the number of barrels, each cylinder having four firing-chambers therein which are adapted to be successively brought into alinement with the bores of the barrels, magazine-chutes so arranged that the bottom cartridges therein will lie in alinement with certain of the chambers, loading-plungers for forcing the bottom cartridges of the magazines within the proper chambers of the cylinders, hammers for firing the cartridges when brought into alinement with the barrels, ejectors for forcing the used shells from out the cylinders, locking-bolts adapted to hold the cylinders against movement when the firing takes place, mechanism for bringing about the movements of said parts, a main shaft journaled upon the gun-bed, a series of arms carried by said shaft for effecting the movements of the mechanisms, a beveled gear loosely mounted upon said shaft, a pin projecting from said shaft into engagement with a slot formed in the hub of said gear whereby the motion of the shaft is communicated to the hub, a pinion meshing with said gear, a shaft upon which said pinion is secured, a double lever carried upon the opposite end of said shaft, ratchet-arms pivoted to the cylinder, links for connecting the ends of the double lever to the ratchet-arms, pawls carried by said arms, ratchets with which said pawls are adapted to engage, a reservoir-tank, tubes leading from slots formed in the gun-barrels to said tank, check-valves interposed between said slots and tank and so arranged as to permit the inflow of gas to the tank but prevent its outflow, a power-cylinder communicating with the tank by pipes, valves arranged within said pipes for controlling the induction and exhaust of gases to and from the power-cylinder, a piston-rod connected to a piston adapted to slide within the power-cylinder, an arm secured upon the main shaft carrying a pin with which a slot in said piston-rod engages, and valve mechanism connected to the piston-rod for bringing about the proper movements of the induction and exhaust valves, substantially as and for the purposes set forth.

6. In combination with a gun of the character described, a reservoir-tank, tubes leading from said tank to slots in the barrels of the gun whereby a portion of the gases of explosion is admitted to the reservoir, a power-cylinder communicating with said reservoir, and means for effecting the loading and discharging of the gun from the power-cylinder, as specified.

7. In combination with a gun of the character described, two barrels mounted upon a suitable bed, cylinders adapted to work in conjunction therewith, a reservoir-tank adapted to hold gas under pressure, tubes leading from said reservoir to slots formed in said barrels, a power-cylinder communicating with said reservoir, valves 99 interposed between the communication between the reservoir and power-cylinder, valve mechanism for operating said valves in time with the movement of the piston within said cylinder, and mechanisms adapted to be actuated by the movements of said piston to operate the cylinders, substantially as and for the purpose set forth.

8. In a gun of the character described, two barrels mounted upon a suitable bed, two cylinders adapted to work in conjunction therewith, a power-cylinder having a piston arranged to slide therein, and means for conveying a portion of the gases of explosion from the barrels to said cylinder whereby the piston will be caused by suitable connections to actuate the several mechanisms for bringing about the loading and firing of the gun, substantially as shown and described.

In testimony whereof I have hereunto affixed my signature in the presence of two subscribing witnesses.

ROMULUS R. RICHMOND.

Witnesses:
S. S. WILLIAMSON,
G. W. ALEXANDER,
C. H. ALEXANDER.